United States Patent [19]

Dettloff et al.

[11] Patent Number: 4,614,788
[45] Date of Patent: Sep. 30, 1986

[54] THERMOSETTABLE EPOXY RESIN COMPOSITION

[75] Inventors: Marvin L. Dettloff, Lake Jackson; Dennis L. Steele, Freeport; Ross C. Whiteside, Jr., Angleton, all of Tex.

[73] Assignee: The Dow Chemical Company, Midland, Mich.

[21] Appl. No.: 770,138

[22] Filed: Aug. 28, 1985

[51] Int. Cl.$^4$ .................... C08G 59/56; C08G 59/72
[52] U.S. Cl. .................... 528/91; 525/504; 525/538; 528/102; 528/108; 528/399
[58] Field of Search ............... 528/91, 102, 108, 399; 525/504, 538

[56] References Cited

U.S. PATENT DOCUMENTS

| | | | |
|---|---|---|---|
| 3,641,193 | 2/1972 | Frank et al. | 528/108 X |
| 4,225,697 | 9/1980 | Hergenrother et al. | 528/399 X |
| 4,237,263 | 12/1980 | Allcock et al. | 528/399 |

FOREIGN PATENT DOCUMENTS 31181 9/1964 Fed. Rep. of Germany.
5040439 1/1972 Japan.

OTHER PUBLICATIONS

Chem. Abstr. 80:27823j (1974).
Chem. Abstr. 81:153388e (1974).
Chem. Abstr. 82:171840w (1975).
Chem. Abstr. 82:18014k (1975).
Chem. Abstr. 83:11313u (1975).
Chem. Abstr. 86:190913w (1977).
Chem. Abstr. 87:152864u (1977).
Chem. Abstr. 98:180490g (1983).
Derwent Abstr. 77777R (1970).
Chem. Abstr. 80:109318n (1974).

Primary Examiner—Earl Nielsen
Attorney, Agent, or Firm—J. G. Carter

[57] ABSTRACT

Disclosed are thermosettable compositions comprising (A) an epoxy resin such as the diglycidyl ether of bisphenol A; (B) boron trifluoride complexed with a primary, secondary or tertiary amine such as monoethanolamine and (C) at least one cyclic or acyclic phosphazene having at least one pendant

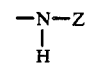

group wherein Z is an alkyl or an aryl group such as hexa(n-propylamino)cyclotriphosphazene.

When cured, these compositions have an increased glass transition temperature (Tg) value as compared to a similar composition without the phosphazene compound.

These compositions are useful in potting compositions, wet lay-up and pre-impregnated laminate, adhesive, molding, coating, casting, encapsulation, filament winding and transfer molding applications.

8 Claims, No Drawings

THERMOSETTABLE EPOXY RESIN COMPOSITION

BACKGROUND OF THE INVENTION

The present invention pertains to thermosettable epoxy resin compositions containing an epoxy resin, boron trifluoride complexed with a primary, secondary or tertiary amine and a phosphazene compound.

Phosphazenes have been employed to cure epoxy resins as disclosed in Chem. Abstr. 81:153388e and Chem. Abstr. 82:18014k. Boron trifluoride and its complexes with ethers and amines have been known to cure epoxy resins; however, it would be desirable if the glass transition temperature of the cured products could be raised.

It has been discovered that certain phosphazene compounds can be employed in boron trifluoride amine complex cured epoxy resins to increase the glass transition temperature (Tg).

SUMMARY OF THE INVENTION

The present invention pertains to thermosettable epoxy resin compositions which comprise (A) at least one epoxy resin having an average of more than one vicinal 1,2-epoxy group;
(B) at least one boron trifluoride complex of a primary, secondary or tertiary amine or combination thereof; and
(C) at least one acyclic or cyclic phosphazene compound having at least one pendant

group wherein Z is a hydrocarbyl or a halogen substituted hydrocarbyl group having from 1 to about 20, preferably from 1 to about 10, most preferably from 1 to about 6 carbon atoms or a —Q-(-Q—Q')$_n$ or a —Q-(-S—Q')$_n$ group wherein each Q and Q' is independently a divalent hydrocarbyl or halogen substituted hydrocarbyl group wherein the total number of carbon atoms in the Q and the Q' groups is from 2 to about 20, preferably from about 2 to about 10, most preferably from 2 to about 6 carbon atoms and n has a value from 1 to about 10; wherein component (B) is employed in an amount of from about 2 to about 10, preferably from about 3 to about 5 parts per one hundred parts by weight of component (A); component (C) is employed in an amount which provides an improvement in the glass transition temperature of the composition when cured but a quantity less than that quantity which results in decomposition of the resin mixture during cure, preferably from about 3 to about 25, most preferably from about 10 to about 24 parts of component (C) per one hundred parts by weight of component (A); and wherein a mixture consisting only of components (A), (B) and (C) forms a homogeneous composition at a temperature below which gellation of the mixture occurs.

DETAILED DESCRIPTION OF THE INVENTION

The epoxy resins employed in the present invention can be either halogen-free or they can contain halogen substituents.

Suitable halogen-free epoxy resins which can be employed herein include, for example, the glycidyl ether derivatives of (a) aliphatic or cycloaliphatic hydroxyl-containing materials, (b) aromatic hydroxyl-containing materials (c) amines and (d) acids. Particularly suitable are the glycidal ethers of polyhydric aromatic compounds such as, for example, dihydroxy biphenyls, bisphenols, phenol-aldehyde novolac resins, trihydroxyphenyl alkanes, mixtures thereof and the like.

Suitable halogenated epoxy resins which can be employed herein include, for example, the halogenated, particularly brominated and/or chlorinated derivatives of the aforementioned halogen-free epoxy resins.

Suitable boron trifluoride complexes include, for example, those complexed with primary, secondary or tertiary amines or combinations thereof such as, for example, methylamine, ethylamine, n-propylamine, isopropylamine, n-hexylamine, tributylamine, monoethanolamine, diethanolamine, triethanolamine, piperidine, aniline, N—methylaniline, N,N—dimethylaniline, mixtures thereof and the like.

Suitable phosphazene compounds which can be employed herein include, for example, those acyclic and cyclic phosphazenes represented by the formula

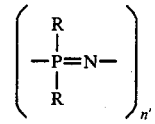

wherein each R is independently a halogen, preferably chlorine or bromine or a —R', —O—R' or —S—R' group wherein R' is a hydrocarbyl or a halogen substituted hydrocarbyl group having from 1 to about 10, preferably from 1 to about 5, most preferably from 1 to about 3 carbon atoms or a —Q-(-Q—Q')$_n$ or a —Q-(-S—O')$_n$ group wherein each Q and Q' is independently a divalent hydrocarbyl or halogen substituted hydrocarbyl group wherein the total number of carbon atoms in the Q and Q' groups is from 2 to about 10, preferably from about 2 to about 6, most preferably from 2 to about 4 carbon atoms and n has a value from 1 to about 10; or a group represented by the formula

wherein each $R^1$ and $R^2$ is independently a hydrocarbyl or a halogen substituted hydrocarbyl group having from 1 to about 20, preferably from 1 to about 10, most preferably from 1 to about 6 carbon atoms or a —Q-(-Q—Q')$_n$ or a —Q-(-S—Q')$_n$ group wherein each O and O' is independently a divalent hydrocarbyl or halogen substituted hydrocarbyl group wherein the total number of carbon atoms in the Q and Q' groups is from 2 to about 20, preferably from about 2 to about 10, most preferably from 2 to about 6 carbon atoms and n has a value from 1 to about 10; n' has a value from about 3 to about 15,000, preferably from about 3 to about 15, most preferably 3 or 4; with the proviso that at least one of the R groups must be a group represented by the formula

The term hydrocarbyl as employed herein means any aliphatic, cycloaliphatic, aromatic, aryl substituted aliphatic or aliphatic substituted aromatic groups.

The phosphazene compounds employed herein can be prepared by methods described in the literature such as, for example, that described by H. R. Allcock in *Phosphorus-Nitrogen Compounds,* Academic Press, New York, New York, 1972 which is incorporated herein by reference.

The compositions of the present invention can be employed in potting, wet lay-up and pre-impregnated laminate, adhesive, molding, coating, casting, encapsulation, filament winding and transfer molding applications.

The compositions of the present invention can also contain, if desired, dyes, pigments, fillers, solvents, reinforcing materials, flow control agents, fire retardant agents, mold release agents, rubber modifiers, surfactants, reactive diluents, accelerators, combinations thereof and the like.

The following examples are illustrative of the present invention, but are not to be construed as to limiting the scope thereof in any manner.

EXAMPLE 1

A. Preparation of Phosphazene Compound

A mixture of 165 g (2.8 moles) of n-propylamine in 250 ml of toluene was slowly added to a cooled 2-liter round bottom flask containing 750 ml of toluene and 53.1 g (0.46 mole) of a mixture consisting of 80% by weight of hexachlorocyclotriphosphazene and 20% by weight of octachlorocyclotetraphosphazene. During addition of the n-propylamine, the reaction temperature was maintained below 25° C. After addition was complete, the reaction mixture was stirred for at least 15 hours (54,000 s) at room temperature, after which the reaction mixture was refluxed for approximately 2 hours (7200 s). Upon cooling to room temperature, the n-propylamine hydrochloride salt was removed by suction filtration. The filtrate was extracted with distilled water until the pH of the water extract was neutral and then dried over anhydrous sodium sulfate. After removing the sodium sulfate by gravity filtration, the toluene was removed in vacuo leaving the solid product mixture of hexa(n-propylamino)cyclotriphosphazene and octa(n-propylamino)cyclotetraphosphazene.

B. Preparation of Thermsettable Composition

To a mixture of 5 grams (0.027 equiv.) of a diglycidyl ether of bisphenol A having an epoxide equivalent weight (EEW) of 188 and 5 grams (0.015 equiv.) of a diglycidyl ether of tetrabromobisphenol A having an EEW of 330 were added 0.3 gram of boron trifluoride.-monoethanolamine complex and varying amounts of the phosphazene compound prepared in A above.

C. Curing and Testing

The above formulations were cured at 175° C. for 2 hours (7200 s). The glass transition (Tg) temperatures were determined in a nitrogen atmosphere at a heating rate of 10° C. per minute (0.167° C. per second) on a DuPont 1090 Thermal Analyzer. The results are given in the following Table I.

TABLE I

| SAMPLE NO. | BORON TRIFLUORIDE COMPLEX phr* | AMOUNT OF PHOSPHAZENE COMPOUND phr* | Tg (°C.) |
|---|---|---|---|
| 1 | 3 | 0 | 161.8 |
| 2 | 3 | 3 | 106.7 |
| 3 | 3 | 5 | 134.3 |
| 4 | 3 | 8 | 171.4 |
| 5 | 3 | 10 | 176.4 |
| 6 | 3 | 16 | 171.5 |
| 7 | 3 | 18 | Decomposed during cure |

*phr = parts per 100 parts by weight of epoxy resin

EXAMPLE 2

A. Preparation of Phosphazene Compound

A phosphazene compound prepared as in Example 1-A was employed.

B. Preparation of Thermosettable Composition

To a mixture of 5 grams (0.027 equiv.) of a diglycidyl ether of bisphenol A having an epoxide equivalent weight (EEW) of 188 and 1.58 grams (0.0048 equiv.) of a diglycidyl ether of tetrabromobisphenol A having an EEW of 330 was added 0.2 grams of boron trifluoride.-monoethanolamine complex and varying amounts of the phosphazene compound prepared in A above.

C. Curing and Testing

The above formulations were cured at 175° C. for 7 hours (25,200 s). The Tg temperatures were determined in a nitrogen atmosphere at a heating rate of 10° C. per minute (0.167° C. per second) on a DuPont 1090 Thermal Analyzer. The results are given in the following Table II.

TABLE II

| SAMPLE NO. | BORON TRIFLUORIDE COMPLEX phr* | AMOUNT OF PHOSPHAZENE COMPOUND phr* | Tg (°C.) |
|---|---|---|---|
| 1 | 3 | 0 | 171.4 |
| 2 | 3 | 3 | 152.1 |
| 3 | 3 | 5 | 166.4 |
| 4 | 3 | 7 | 186.0 |
| 5 | 3 | 10 | 188.8 |
| 6 | 3 | 16 | 185.8 |
| 7 | 3 | 19 | 187.1 |
| 8 | 3 | 25 | decomposed during cure |

*phr = parts per 100 parts by weight of epoxy resin

EXAMPLE 3

A. Preparation of Phosphazene Compound

A phosphazene compound prepared as in Example 1-A was employed.

B. Preparation of Thermosettable Composition

To 5 grams (0.027 equiv.) of a diglycidyl ether of bisphenol A having an epoxide equivalent weight (EEW) of 188 was added 0.15 grams of boron trifluoride.monoethanolamine complex and varying amounts of the phosphazene compound prepared in A above.

C. Curing and Testing

The above formulations were cured at 175° C. for 2 hours (7200 s). The Tg temperatures were determined in a nitrogen atmosphere at a heating rate of 10° C. per minute (0.167° C. per second) on a DuPont 1090 Thermal Analyzer. The results are given in the following Table III.

TABLE III

| SAMPLE NO. | BORON TRIFLUORIDE COMPLEX phr* | AMOUNT OF PHOSPHAZENE COMPOUND phr* | Tg (°C.) |
|---|---|---|---|
| 1 | 3 | 0 | 140.2 |
| 2 | 3 | 3 | 78.8 |
| 3 | 3 | 5 | 79.4 |
| 4 | 3 | 7 | 115.3 |
| 5 | 3 | 9 | 136.7 |
| 6 | 3 | 15 | 164.9 |
| 7 | 3 | 19 | 172.3 |
| 8 | 3 | 22 | 183.0 |
| 9 | 3 | 25 | decomposed during cure |

*phr = parts per 100 parts by weight of epoxy resin

EXAMPLE 4

A. Preparation of Phosphazene Compound

A phosphazene compound prepared as in Example 1-A was employed.

B. Preparation of Thermosettable Composition

To 5 grams (0.0152 equiv.) of a diglycidyl ether of tetrabromobisphenol A having an epoxide equivalent weight (EEW) of 330 was added 0.15 grams of boron trifluoride.monoethanolamine complex and varying amounts of the phosphazene compound prepared in A above.

C. Curing and Testing

The above formulations were cured at 175° C. for 4 hours (14,400 s). The Tg temperatures were determined in a nitrogen atmosphere at a heating rate of 10° C. per minute (0.167° C. per second) on a DuPont 1090 Thermal Analyzer. The results are given in the following Table IV.

TABLE IV

| SAMPLE NO | BORON TRIFLUORIDE COMPLEX phr* | AMOUNT OF PHOSPHAZENE COMPOUND phr* | Tg (°C.) |
|---|---|---|---|
| 1 | 3 | 0 | 143.4 |
| 2 | 3 | 2 | 137.3 |
| 3 | 3 | 7 | 188.5 |
| 4 | 3 | 10 | 173.8 |
| 5 | 3 | 15 | 163.0 |
| 6 | 3 | 19 | decomposed during cure |

*phr = parts per 100 parts by weight of epoxy resin

EXAMPLE 5

A. Preparation of Phosphazene Compound 23.3 g (0.52 mole) of ethylamine was slowly purged into a cooled 250 ml round bottom flask containing 100 ml of toluene and 10 g (0.027 mole) of a mixture consisting of 80% by weight of hexachlorocyclotriphosphazene and 20% by weight of octachlorocyclotetraphosphazene. During addition of the ethylamine, the reaction temperature was maintained below 25° C. After addition was complete, the reaction mixture was stirred for at least 15 hours (5400 s) at room temperature. The ethylamine hydrochloride salt was then removed by suction filtration. The filtrate was extracted with distilled water until the pH of the water extract was neutral and then dried over anhydrous sodium sulfate. After removing the sodium sulfate by gravity filtration, the toluene was removed in vacuo leaving the solid product mixture of hexa(ethylamino)cyclotriphosphazene and octa(ethylamino)cyclotetraphosphazene.

B. Preparation of Phosphazene Compound

A mixture of 3 g (0.0086 mole) of hexachlorotriphosphazene in 20 ml of benzene was slowly added to a cooled 250 ml round bottom flask containing 70 ml of benzene and 8.2 g (0.11 mole) of n-butylamine. During addition of the n-butylamine, the reaction temperature was maintained below 45° C. After addition was complete, the reaction mixture was refluxed for approximately 19 hours (68,400 s). Upon cooling to room temperature, the n-butylamine hydrochloride salt was removed by suction filtration. The filtrate was extracted with distilled water until the pH of the water extract was neutral and then dried over anhydrous sodium sulfate. After removing the sodium sulfate by gravity filtration, the benzene was removed in vacuo leaving the solid product of chloropenta(n-butylamino)cyclotriphosphazene.

C. Preparation of Thermosettable Composition

To 5 grams (0.27 equiv.) of a diglycidyl ether of bisphenol A having an epoxide equivalent weight (EEW) of 188 was added 0.15 gram of borontrifluoride.monoethanolamine complex and varying amounts of the phosphazene compounds prepared in A and B above.

D. Curing and Testing

The above formulations were cured at 175° C. for 2 hours (7200 s). The Tg temperatures were determined in a nitrogen atmosphere at a heating rate of 10° C. per minute (0.167° C. per second) on a DuPont 1090 Thermal Analyzer. The results are given in the following Table V.

TABLE V

| SAMPLE NO. | BORON TRIFLUORIDE COMPLEX phr* | AMOUNT OF PHOSPHAZENE COMPOUND phr* | Tg (°C.) |
|---|---|---|---|
| 1 | 3 | 0 | 136.6 |
| 2 | 3 | 3** | 178.0 |
| 3 | 3 | 5*** | 153.6 |

*phr = parts per 100 parts by weight of epoxy resin
**The mixture of phosphazene compounds prepared in Example 5-A was employed.
***The phosphazene compound prepared in Example 5-B was employed.

EXAMPLE 6

A. Preparation of Phosphazene Compound

A phosphazene compound prepared as in Example 1-A was employed.

B. Preparation of Thermosettable Composition

To 5 grams (0.027 equiv.) of a diglycidyl ether of bisphenol A having an epoxide equivalent weight (EEW) of 188was added 0.2 gram of either borontrifluoride.diethylamine complex or borontrifluoride.N-

,N—dimethylaniline complex and varying amounts of the phosphazene compound prepared in A above.

C. Curing and Testing

The above formulation containing borontrifluoride.-diethylamine complex was cured at 175° C. for 2 hours (7200 s) and then at 210° C. for 1 hour (3600 s). The above formulation containing borontrifluoride.N-,N—dimethylaniline complex was cured at 150° C. for 1 hour (3600 s) and then at 175° C. for 2 hours (7200 s). The Tg temperatures were determined in a nitrogen atmosphere at a heating rate of 10° C. per minute (0.167° C. per second) on a DuPont 1090 Thermal Analyzer. The results are given in the following Table VI.

TABLE VI

| SAMPLE NO. | BORON TRIFLUORIDE COMPLEX phr* | AMOUNT OF PHOSPHAZENE COMPOUND phr* | Tg (°C.) |
|---|---|---|---|
| 1 | 4** | 0 | 78.8 |
| 2 | 4** | 16 | 172.5 |
| 3 | 4*** | 0 | 159.0 |
| 4 | 4*** | 16 | 169.6 |

*phr = parts per 100 parts by weight of epoxy resin
**Borontrifluoride.diethylamine complex was employed.
***Borontrifluoride.N,N—dimethylaniline complex was employed.

We claim:

1. A thermosettable epoxy resin composition which comprises
   (A) an epoxy resin having an average of more than one vicinal 1,2-epoxy groups per molecule or a mixture thereof;
   (B) at least one boron trifluoride complex of a primary, secondary or tertiary amine or combination thereof; and
   (C) at least one acyclic or cyclic phosphazene compound having at least one pendant $$-\underset{H}{\overset{}{N}}-Z$$

group wherein Z is a hydrocarbyl or a halogen substituted hydrocarbyl group having from about 1 to about 20 or a $-Q(-O-Q')_n$ or a $-Q(-S-Q')_n$  group wherein each Q and Q' is independently a divalent hydrocarbyl or halogen substituted hydrocarbyl group wherein the total number of carbon atoms in the Q and Q' groups is from 2 to about 20 and n has a value from 1 to about 10;
wherein component (B) is employed in an amount of from about 2 to about 10 parts per one hundred parts by weight of component (A); component (C) is employed in an amount which provides an improvement in the glass transition temperature of the composition when cured but a quantity less than that quantity which results in decomposition of the resin mixture during cure and wherein a mixture consisting only of components (A), (B) and (C) forms a homogeneous composition at a temperature below which gelation of the mixture occurs.

2. A composition of claim 1 wherein component (B) is employed in an amount of from about 3 to about 5 parts per one hundred parts by weight of component (A); component (C) is employed in an amount of from about 3 to about 25 parts per one hundred parts by weight of component (A).

3. A composition of claim 2 wherein component (B) is boron trifluoride complexed with (a) an alkylamine having from 1 to about 6 carbon atoms, (b) a dialkylamine having from 1 to about 6 carbon atoms in each alkyl group, (c) a trialkylamine having from about 1 to about 6 carbon atoms in each alkyl group, (d) an alkanolamine having from 1 to about 6 carbon atoms, (e) a dialkanolamine having from 1 to about 6 carbon atoms in each alkyl group, (f) a trialkanolamine having from about 1 to about 6 carbon atoms in each alkyl group, (g) an aryl amine having from about 6 to about 12 carbon atoms, (h) an N—alkyl aryl amine having a total of from about 7 to about 15 carbon atoms (i) any combination of any two or more of (a) through (h).

4. A composition of claim 3 wherein component (C) is employed in an amount of from about 10 to about 24 parts per one hundred parts by weight of component (A) and component (A) is a diglycidyl ether of bisphenol A, a diglycidyl ether of tetrabromobisphenol A or a mixture thereof; component (B) is boron trifluoride.2-aminoethanol complex, boron trifluoride.diethylamine complex, boron trifluoride.N,N—dimethylaniline complex or combination thereof and component (C) is hexa(n-propylamino)cyclotriphosphazene, octa(n-propylamino)cyclotetraphosphazene, chloropenta(n-butylamino)cyclotriphosphazene or combination thereof.

5. A product resulting from curing a composition of claim 1.

6. A product resulting from curing a composition of claim 2.

7. A product resulting from curing a composition of claim 3.

8. A product resulting from curing a composition of claim 4.

* * * * *